Figure 1:
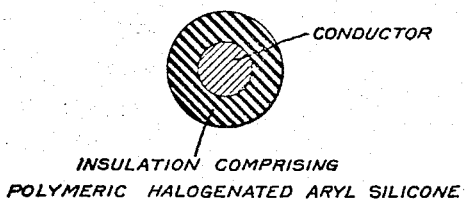

Oct. 7, 1941.    E. G. ROCHOW    2,258,219

HALOGENATED ARYL SILICONES

Filed Sept. 27, 1939

INSULATION COMPRISING
POLYMERIC HALOGENATED ARYL SILICONE

INSULATION COMPRISING FIBROUS
MATERIAL COATED AND IMPREGNATED
WITH POLYMERIC HALOGENATED ARYL SILICONE

Inventor:
Eugene G. Rochow,
by Harry E. Dunham
His Attorney.

UNITED STATES PATENT OFFICE 2,258,219

HALOGENATED ARYL SILICONES

Eugene G. Rochow, Schenectady, N. Y., assignor to General Electric Company, a corporation of New York Application September 27, 1939, Serial No. 296,819

22 Claims. (Cl. 174—121)

This invention relates to new compositions of matter, their preparation and use. More particularly it is concerned with new and useful polymeric bodies comprising chemical compounds of silicon, oxygen, and at least one halogenated aryl grouping attached directly to silicon.

In the chemical literature, the name "silicone" is given to compounds of the general type

and their polymers, where R and R' are the same or different alkyl or aryl radicals or any other organic radicals capable of direct union with the silicon atom.

With reference to the above formula, the products of this invention are those in which either or both R and R' are halogenated aryl radicals. When only one of the groupings is a halogenated aryl radical, the other may be an alkyl, aryl, aralkyl or other non-halogen-containing grouping capable of being attached directly to silicon. The term "halogenated aryl silicone" as used generally hereinafter and in the appended claims is intended to include within its meaning silicones such as above described. Examples of such silicones are di-(trichlorophenyl) silicone, $(C_6H_2Cl_3)_2SiO$; di-(bromophenyl) silicone, $(C_6H_4Br)_2SiO$; methyl trichlorophenyl silicone $(CH_3)(C_6H_2Cl_3)SiO$; and chlorotolyl silicone, $(C_7H_7Cl)_2SiO$. Such silicones may be produced in polymeric form by processes such as hereafter described. The resulting polymeric bodies have certain properties which render them particularly useful in industry.

The introduction of halogen atoms into the aryl nuclei of these silicones is essential to this invention, and results in hitherto unknown products having the important property of flame resistance. Thus, while di-phenyl silicone burns quite readily upon application of a flame, the introduction of one chlorine atom into each phenyl group renders the product less flammable. Similarly, the introduction of two chlorine atoms into each phenyl group imparts greater flame resistance than the introduction of one chlorine atom. Such mono- and di-chloro derivatives, while suitable for some applications, are not wholly flameproof. For this reason I prefer to introduce at least three chlorine atoms into each phenyl group, whereupon a substantially non- flammable resinous composition is obtained. Similarly, for other aryl nuclei I may introduce any number of halogen atoms up to the limit of combining power of the particular nucleus, but I prefer that the number of halogen atoms be sufficient to render the end-product substantially nonflammable.

The halogenated aryl silicones of this invention continue to polymerize slowly upon the application of heat, changing from soluble thermoplastic bodies to substantially infusible, relatively insoluble resinous materials. Some of the lower molecular weight (partly polymerized) polymers have a relatively low softening point, for example about 50° to 60° C. By heating at, for instance, 175° to 250° C., they gradually increase in softening point to 300° C. and above. As the heating is continued, their solubility in organic solvents (e. g., benzene, toluene, carbon tetrachloride, acetonyl acetone, ethylene dichloride, etc.) correspondingly decreases and they become more brittle at room temperature. These polymeric bodies are unaffected by water, and are useful up to temperatures of the order of 450° C. The electrical properties are good. For example, a sample of tri-chlorophenyl silicone showed a specific conduction below $10^{-9}$ reciprocal ohms per cm. cube at 320° C. and below $10^{-12}$ at room temperature. The dielectric constant of this sample was 5.0 at 320° C. and 3.5 at room temperature.

Any suitable method may be used in preparing the halogenated aryl silicones of this invention, and the choice of method is made largely on the basis of the yield obtained. For example, a halogenated aryl silicone may be prepared by halogenating, specifically chlorinating, an aryl silicon dihalide, specifically di-phenyl silicon dichloride, hydrolyzing the resulting product and dehydrating the hydrolyzed product.

In order that those skilled in the art better may understand how the invention may be carried into effect, the following illustrative examples are given:

EXAMPLE I

*Preparation of chlorinated di-phenyl silicone*

1. Two and one-fourth (2¼) mols of phenyl magnesium bromide in ether solution are added, with rapid stirring, to one mol of silicon tetrachloride. Successive chlorine atoms of the silicon tetrachloride are replaced by phenyl groups. The principal product of the reaction is diphenyl silicon dichloride. The reaction between the components may be expressed as follows:

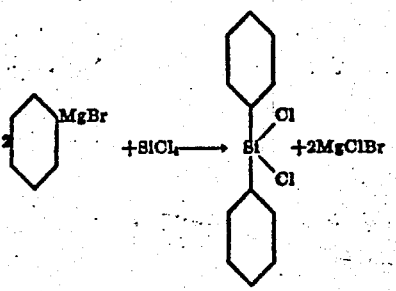

Some quantities of phenyl silicon trichloride and triphenyl silicon chloride are produced at the same time.

2. The ether solution of the products is filtered from the magnesium salts under anhydrous conditions, after which the ether is evaporated. The residue is distilled under diminished pressure in order to separate di-phenyl silicon dichloride from its homologs.

3. The distilled di-phenyl silicon dichloride is mixed with a suitable catalyst, for example about 0.5% by weight thereof of iron powder or about 0.1% by weight of antimony pentachloride. Other catalysts which may be used include metallic antimony, antimony trichloride and ferrous and ferric chloride. Thereafter chlorine is passed into the mass at a suitable temperature, for instance at from 70° to 120° C. Chlorination is continued until the weight relations show that from 2 to 10, preferably from 6 to 10, gram-atoms of chlorine have been introduced per mol of di-phenyl silicon dichloride. With the introduction of six gram-atoms of chlorine this means that an average of three hydrogen atoms per benzene ring have been replaced by chlorine. This reaction may be expressed thus:

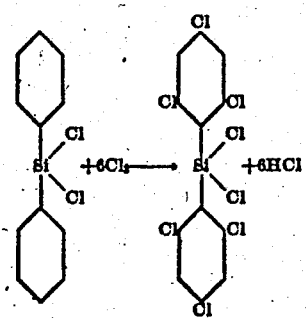

The chlorine atoms are believed to orient themselves in the benzene nuclei as shown, but possibly may assume other positions in the rings.

In the chlorination of other aryl silicones in which there are side chains on the aromatic nucleus, the chlorine may be introduced into the side chain as well as the nucleus. However, since the chlorine in the aliphatic side chain is removed, upon thermal decomposition, more readily than chlorine introduced into the aromatic nucleus, I prefer to introduce the chlorine or other halogen principally or exclusively into the aromatic nucleus, and the catalyst and other conditions of halogenation are chosen to this end.

In producing a chlorinated aryl silicon I may introduce into the aryl nucleus any number of chlorine atoms up to the combining power of the particular nucleus. However, in order to obtain optimum flame resistance, I prefer that the number of chlorine atoms be equal to, or greater than, one-half the number of carbon atoms in the nucleus.

4. The chlorinated product is distilled under diminished pressure to remove as a distillate a purified chlorinated di-phenyl silicon dichloride and to leave a residue of dark-colored, tarry substances.

5. The purified chlorinated di-phenyl silicon dichloride is hydrolyzed by pouring it into water and boiling. This reaction may be expressed as follows:

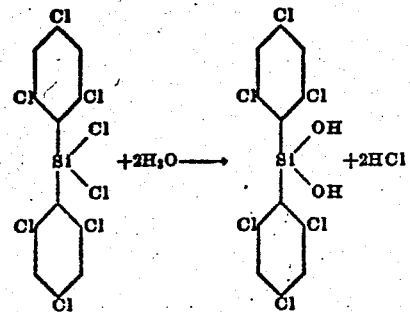

This hydroxy compound or silicol is a flocculent white mass, insoluble in water but readily soluble in organic solvents. The flocculent mass is separated and thereafter washed with water to remove excess acid. It is converted to a silicone by gradual dehydration. This is accomplished by heating it to a suitable temperature, for example at about 125° to 150° C. for one hour until it becomes a clear liquid. At this stage the product is believed to be mainly a mixture of low molecular weight polymers of the types (1) $OH-Si(C_6H_2Cl_3)_2-O-Si(C_6H_2Cl_3)_2-OH$;
(2) $OH-Si(C_6H_2Cl_3)_2-O-Si(C_6H_2Cl_3)_2-$
$O-Si(C_6H_2Cl_3)_2-OH$;
(3) $[Si(C_6H_2Cl_3)_2O]_3$, a cyclic trimer;
etc.

7. Upon heating at a higher temperature, for instance at from 175° to 250° C. for at least one hour, the above-described low molecular weight polymers continue to condense and are converted into polymers having the probable unit structure

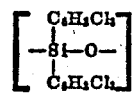

In many applications of these halogenated silicones step No. 7 advantageously may be carried out in situ as hereafter more fully described.

EXAMPLE II

*Preparation of fluorophenyl silicone*

1. Para-fluorophenyl magnesium bromide is prepared by the action of magnesium on p-fluorobromobenzene in ether solution:

$$F-C_6H_4-Br+Mg \rightarrow F-C_6H_4-MgBr$$

2. Two and one-tenth mols of p-fluorophenyl magnesium bromide in ether solution are added, with rapid stirring, to one mol of silicon tetrachloride. The principal reaction is

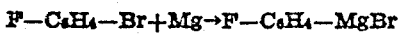
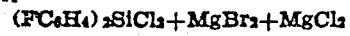

Smaller quantities of $(FC_6H_4)_3SiCl$ and $(FC_6H_4)SiCl_3$ are formed at the same time.

3. The ether solution of the products is filtered from the magnesium salts and the ether is removed by distillation. The compound $(FC_6H_4)_2SiCl_2$ is then separated by distillation under reduced pressure.

4. The purified p-fluorophenyl silicon dichloride is hydrolyzed by pouring it into water and boiling:

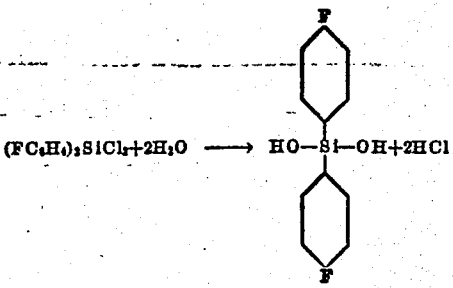

5. After washing with water, the hydroxy compound is dehydrated by heating in an oven for two hours at 110° C. to give a viscous sticky liquid. This liquid may further be polymerized by heating at a higher temperature, for instance at 180° C. for two and one-half hours, to form a yellow resinous solid, soluble in benzene, etc. Although this product contains only one fluorine atom per phenyl nucleus, it does not burn after application of a flame.

EXAMPLE III

*Preparation of methyl chlorophenyl silicone*

1. One mol of phenyl magnesium bromide in ether solution is added, with rapid stirring, to one mol of silicon tetrachloride. The principal reaction is:

$$C_6H_5MgBr + SiCl_4 \rightarrow C_6H_5SiCl_3 + MgBrCl$$

2. The ether solution of phenyl silicon trichloride is filtered from the magnesium salts, concentrated by evaporation, and cooled to about −30° C. One mol of methyl magnesium bromide is added with rapid stirring, the principal reaction being:

$$C_6H_5SiCl_3 + CH_3MgBr \rightarrow$$
$$(C_6H_5)(CH_3)SiCl_2 + MgBrCl$$

3. The ether solution of the product is filtered, and the ether removed by distillation. 0.5% of iron powder is added and chlorine is admitted to the warmed liquid until the weight relations show that four chlorine atoms have been introduced into each phenyl nucleus:

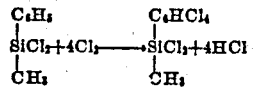

4. The chlorinated product is distilled under reduced pressure to remove as a distillate a purified methyl chlorophenyl silicon dichloride and to leave a residue of dark tarry substances.

5. The purified methyl chlorophenyl silicon chloride is hydrolyzed by pouring into water and boiling:

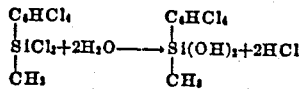

6. The hydrolyzed product is washed with water and then dehydrated by heating in an oven, for example to 100° C. for 16 hours, to form a sticky, opaque solid. Upon further heating to about 205° C. for 1½ hours this material melts and forms a brown, brittle resin which melts at 120° C. and is sparingly soluble in organic solvents. It does not burn after application of a flame.

EXAMPLE IV

*Preparation of iodophenyl silicone*

1. Di-phenyl silicon dichloride, $(C_6H_5)_2SiCl_2$, is prepared in accordance with the method described in Example I.

2. Five mols of di-phenyl silicon dichloride are heated with four mols of iodine and one mol of iodic anhydride:

$$5(C_6H_5)_2SiCl_2 + 4I_2 + I_2O_5 \rightarrow 5(C_6H_4I)_2SiCl_2 + 5H_2O$$

3. The reaction mixture is poured into water to hydrolyze the silicon compound. The resulting hydroxy compound is boiled with an aqueous solution of sodium bisulfite to remove any free iodine, and then washed with water.

4. The washed hydroxy compound is dehydrated by heating to about 180° for 1½ hours, forming a brown resin. It is probable that the dehydration procedures described in Examples II, III and IV involve condensation with loss of water and polymerization to form large molecules in a manner analogous to that described under parts 6 and 7 of Example I.

It is to be understood that this invention is not limited to the production of halogenated phenyl silicones. Thus, instead of using a halogen derivative of benzene as starting material, I may use halogen derivatives of other aryl compounds, such as mono- and poly-alkyl benzenes and mixed alkyl benzenes, more specific examples of which are toluene, xylenes, mono-, di-, and tri-ethyl benzenes, etc.; diphenyl, diphenylene oxide and diphenyl ether; naphthalene, methyl naphthalene and tetrahydro-naphthalene; indene; anthracene, etc. In general, the only requirements for the aryl compound are that it be capable of being attached by carbon linkage to a silicon atom and that it have one or more positions available for the introduction of a halogen atom or atoms.

Aryl silicones containing different halogen atoms in the molecule also may be prepared in accordance with this invention. Thus, instead of introducing a single halogen such as chlorine in the ring nucleus, a mixture of halogens may be introduced, for instance a mixture of chlorine and bromine. In this way the properties of the material may be altered to secure a product best adapted for a particular application.

The halogenated aryl silicones of this invention are essentially resinous in character. In their final form as polymeric bodies they have the advantage of thermal stability greater than that of the ordinary coating and bonding agents. As they are free from many of the limitations of the purely organic substances, these new products may be used to advantage with inorganic fillers and fibers such as asbestos, mica, glass fiber, and the like, to produce a composite insulation capable of withstanding higher temperatures than would be possible with the use of organic binders. This in turn permits the design of electrical machinery for operation at higher temperatures.

Figure 2:
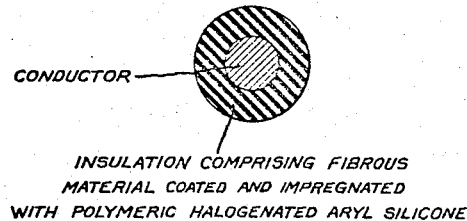

As illustrative examples of how compositions comprising halogenated aryl silicones may be used in the field of insulation, the following are cited:

A liquid coating composition comprising partly polymerized halogenated aryl silicone, specifically chlorinated di-phenyl silicone, and a volatile solvent may be applied to a metallic conductor such as copper wire, which thereafter is heated to vaporize the solvent and to continue or complete the polymerization of the silicone in situ. In manufacturing certain electrical cables it may be desirable to wrap the conductor with an organic or inorganic fibrous material such as asbestos, glass, cotton or paper before treating with the solution. A further procedure is to coat and at least partly impregnate the wrapped conductor with halogenated aryl silicone, wind the thus insulated conductor into the desired coil, and then heat the wound coil to complete the polymerization of the silicone. In the accompanying drawing Fig. 1 represents a cross-sectional view of a metallic conductor provided with insulation comprising polymeric halogenated aryl silicone; and Fig. 2 shows a similar view of a metallic conductor provided with insulation comprising fibrous material coated and impregnated with polymeric halogenated aryl silicone.

Sheet insulation may be prepared by treating woven or felted organic or inorganic fabrics or paper with compositions comprising halogenated aryl silicone. Sheet insulation also may be prepared by binding flaky inorganic substances with halogenated aryl silicone. For example, chlorinated diphenyl silicone may be used in the production of laminated mica products comprising mica flakes cemented and bonded together with the silicone. Such products have a high dielectric strength and outstanding heat resistance, being able to withstand temperatures of the order of 250° to 300° C.

Self-supporting coherent films or sheets of clay such as bentonite may be treated with compositions comprising halogenated aryl silicone to advantage. The silicone may be applied in melted or solution state. In the production of such sheet materials from bentonite, particles of bentonite of ultramicroscopic size are employed, for example particles having a maximum diameter of 3000 Å. (Ångstrom), more specifically from about 500 Å to about 2000 Å. Fibers such as glass may be embedded in, or otherwise associated with, such clayey films or sheets and the composite material treated, for instance coated, with chlorinated di-phenyl silicone or other halogenated aryl silicone. These silicone-treated bentonite and bentonite-glass fiber flexible sheet materials are especially adapted for high temperature electrically insulating applications.

In certain cases it may be desirable to use the silicones in the form of compositions comprising mixtures of different halogenated aryl silicones, the differences residing either in the halogen atom, or in the aryl grouping, or both. Examples of such compositions are mixtures of chlorinated phenyl silicone and brominated phenyl silicone; chlorinated phenyl silicone and chlorinated tolyl silicone; brominated phenyl silicone and chlorinated tolyl silicone. The mixed halogenated silicones may be co-polymerized to yield substantially completely polymerized bodies. Or, the individual silicones may be separately advanced to different intermediate stages of polymerization prior to mixing and completion of the polymerization. For other applications it may be desirable to polymerize the individual silicones to the hard, brittle stage and then mix and grind the materials together to obtain a composite mass.

The individual or mixed solid polymers may be suitably incorporated into normally flammable materials to improve the flame resistance of the latter. For example, they may be compounded with substances such as natural and synthetic rubber; tars, asphalts and pitches, more specific examples of which are wood tars, petroleum asphalts and vegetable pitches; natural resins such as wood rosin, copal, shellac, etc.; synthetic resins such as phenol-aldehyde resins, urea-aldehyde resins, alkyd resins, cumar resins, vinyl resins, esters of acrylic and methacrylic acid, etc.; cellulosic materials such as paper, inorganic and organic esters of cellulose such as cellulose nitrate (pyroxylin), cellulose acetate including the triacetate, cellulose propionate, cellulose butyrate, etc., cellulose ethers such as methyl cellulose, ethyl cellulose, benzyl cellulose, etc.; and with other flammable materials. In certain cases the hard, brittle polymers may be pulverized and used as fillers for substances such as above mentioned. In other cases, especially when the particular halogenated silicone is compatible with the substance with which it is to be incorporated, the silicone may be in the form of a partly polymerized low melting-point body prior to compounding with the substance to be modified.

These halogenated aryl silicones also may be compounded with various other materials. For example, partly polymerized chlorinated diphenyl silicone is compatible with dibutyl phthalate, tricresyl phosphate, chlorinated diphenyls, and ethyl silicate. The hard, brittle halogenated aryl silicones may be plasticized by the addition of suitable plasticizing agents, or the silicones of lower softening point themselves may be used as plasticizers of other normally brittle substances.

Cotton, linen, wool and other flammable materials in thread, cloth or other form may be flame-proofed by suitable treatment with modified or unmodified halogenated aryl silicones. The treated material may be used as insulation for electrical conductors or cables and for other applications where flame resistance is desirable. Likewise, wood and other cellulosic materials may be coated or coated and impregnated with halogenated aryl silicones to impart flame resistance to the treated substance.

The halogenated aryl silicones also may be used as protective coatings for glass and other articles of manufacture which are, or may be, exposed to abnormal heat conditions or to hot flying particles. For example, during welding operations fine particles of metal fly out in all directions and frequently fall on gas-filled lamps used for illumination, the hot metal often breaking the glass bulbs. When bulbs were coated with chlorinated di-phenyl silicone, the film of silicone on the bulb prevented pitting and breaking of the glass.

Chlorinated di-phenyl silicone pigmented with graphite also has been found to be suitable for use as a coating for metal vacuum tubes. Whereas conventional heat-resistant paints were burned off the tube after 300 hours' operation under an accelerated test, the pigmented silicone was unaffected after 600 hours' test. Chlorinated di-phenyl silicone also was found to improve the arc resistance of materials relatively poor in arc resistance. For example, the arc resistance of molded phenolic resin articles having thereon a coating of chlorinated di-phenyl silicone was greatly improved over the uncoated material.

The halogenated aryl silicones also may be used in the preparation of so-called resistance or semi-conducting paints, the outstanding heat and flame resistance of these silicones making them especially valuable for such purposes. As is commonly known, resistance paints contain controlled amounts of conducting materials such as carbon, silicon carbide, powdered metal, conducting oxides, etc., in order to impart to the dried paint a particular degree of resistance or semi-conduction.

The silicones of this invention may be used as sealing compositions, for instance in making vacuum-tight joints between glass and metal. In one such application a solution of chlorinated diphenyl silicone was painted round the metal-to-glass joint of a vacuum tube, which initially showed a 40 micron leak. After baking to remove solvent, the tube was exhausted. Thereafter it was operated for 310 hours and checked for leaks. It was found that the silicone had stopped the leak and the tube functioned in a normal manner.

The low molecular weight polymers herein described also may be dissolved or dispersed in oils, such as linseed oil, Chinawood oil, perilla oil, soya bean oil, etc., alone or mixed with solvents, pigments, plasticizers, driers and other components of coating compositions to yield products which, when applied to a base member and air-dried or baked, have a high degree of heat resistance.

Laminated products may be made by superimposing organic or inorganic fibrous sheet materials coated and impregnated with halogenated aryl silicone, and thereafter bonding the sheets together under heat and pressure. Molding compositions and molded articles may be formed from the silicones of this invention. If desired, filling materials such as asbestos, glass fibers, talc, quartz powder, wood floor, etc., may be incorporated into such compositions prior to molding. Shaped articles are formed from such compositions under heat or under heat and pressure in accordance with practices now widely used in the plastics art.

As used herein and in the appended claims, the term "di-phenyl" has reference to two separate phenyl groups each attached to a silicon atom, as distinguished from "diphenyl," which is the name commonly applied to a compound consisting of two phenyl groups attached directly to each other.

In my copending application Serial No. 332,099, filed April 27, 1940, which application is a continuation-in-part of the present application, I have claimed methyl aryl silicones, including methyl halo-aryl silicones, and insulated conductors and other products utilizing the same. In my copending application Serial No. 332,098, also filed April 27, 1940, and likewise a continuation-in-part of the present case, I have claimed aroxyaryl and aroxyalkyl silicones and insulated conductors and other products wherein such silicones are utilized.

What I claim as new and desire to secure by Letters Patent of the United States is:

1. A composition of matter comprising essentially a chemical compound consisting of silicon, oxygen and at least one halogenated aryl grouping attached directly to silicon.
2. Halogenated aryl silicone.
3. Polymeric halogenated aryl silicone.
4. Polymeric halogenated di-phenyl silicone.
5. Polymeric chlorinated aryl silicone.
6. Polymeric chlorinated di-phenyl silicone.
7. A composition of matter comprising a mixture of polymers of halogenated aryl silicones.
8. A substantially non-flammable resinous composition comprising essentially chlorinated di-phenyl silicone containing at least three chlorine atoms per phenyl nucleus.
9. A liquid coating composition comprising a volatile solvent and partly polymerized, soluble halogenated aryl silicone.
10. A liquid coating composition comprising a volatile solvent and partly polymerized chlorinated di-phenyl silicone containing at least three chlorine atoms per phenyl nucleus, said silicone being capable of further condensation and polymerization under heat.
11. An article of manufacture comprising a base member having thereon a coating comprising polymeric halogenated aryl silicone.
12. An article of manufacture comprising an inorganic sheet material treated with a composition comprising polymeric halogenated aryl silicone.
13. An article of manufacture comprising a sheet material formed of cohering particles of bentonite, said sheet material being treated with a composition comprising polymeric chlorinated aryl silicone.
14. An article of manufacture comprising a mass formed of glass fibers, said mass being coated and at least partly impregnated with a composition comprising polymeric chlorinated aryl silicone.
15. An article of manufacture comprising asbestos coated and at least partly impregnated with a composition comprising polymeric chlorinated aryl silicone.
16. An insulated electrical conductor comprising a metallic conductor and insulation thereon comprising polymeric halogenated aryl silicone.
17. An electrical cable comprising a metallic conductor and insulation thereon comprising a mass formed of inorganic fibrous material, said mass being coated and at least partly impregnated with a composition comprising polymeric chlorinated aryl silicone.
18. An insulated electrical conductor comprising a metallic conductor and insulation thereon comprising polymeric chlorinated di-phenyl silicone.
19. The method of preparing a halogenated aryl silicone which comprises halogenating an aryl silicon di-halide, hydrolyzing the resulting product and dehydrating the hydrolyzed product.
20. An electrically insulating material comprising essentially a polymer of halogenated aryl silicone.
21. A product comprising essentially a halogenated aryl silicone in an insoluble, infusible state.
22. A composition comprising a mixture containing an organic plastic composition and a polymer of halogenated aryl silicone.

EUGENE G. ROCHOW.